Figure 1:
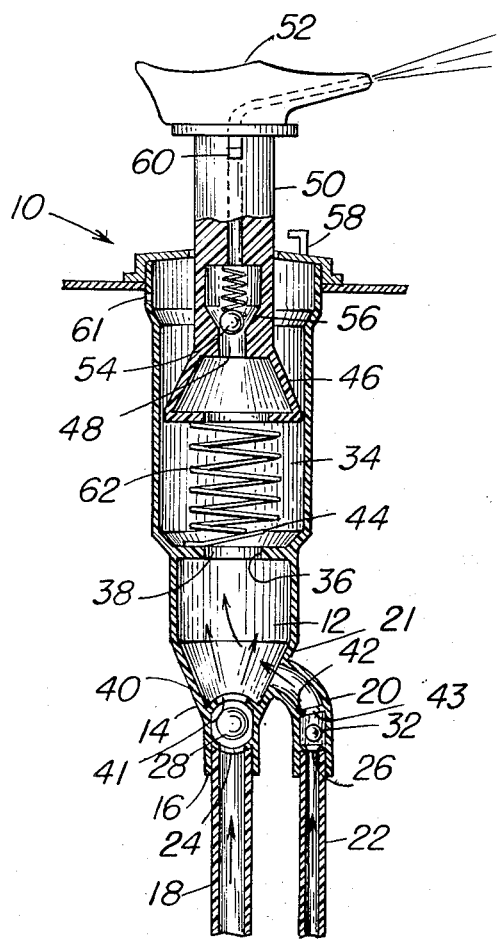

United States Patent [19]

Metzler, III

[11] 3,786,963
[45] Jan. 22, 1974

[54] APPARATUS FOR DISPENSING MIXED COMPONENTS

[75] Inventor: Gottfried Metzler, III, Lancaster, Pa.

[73] Assignee: The Mennen Company, Morristown, N.J.

[22] Filed: Nov. 4, 1971

[21] Appl. No.: 195,714

[52] U.S. Cl.................. 222/136, 222/376, 222/385
[51] Int. Cl............................................... B67d 5/50
[58] Field of Search ... 222/376, 136, 385, 383, 145; 417/504, 458

[56] References Cited
UNITED STATES PATENTS

| 2,531,980 | 11/1956 | Johnson | 222/385 X |
| 3,640,470 | 2/1972 | Susuki et al. | 222/385 X |
| 2,792,974 | 5/1957 | Smith et al. | 222/376 |
| 3,302,831 | 2/1967 | Matheney | 222/136 X |
| 1,045,964 | 12/1912 | Friese | 417/458 X |

Primary Examiner—Robert B. Reeves
Assistant Examiner—John P. Shannon
Attorney, Agent, or Firm—Davis, Hoxie, Faithfull & Hapgood

[57] ABSTRACT

An apparatus for dispensing mixed components including a mixing chamber, first means for directing a first liquid component into the mixing chamber, second means for directing a second liquid component into the mixing chamber, valve means for normally preventing the liquid components from entering the mixing chamber from the first and second component directing means, and pump means for opening the valve means to withdraw the liquid components into the mixing chamber for mixing and dispensing of the resulting product from the mixing chamber.

2 Claims, 2 Drawing Figures

PATENTED JAN 22 1974      3,786,963

APPARATUS FOR DISPENSING MIXED COMPONENTS

The present invention relates to an apparatus for dispensing mixed components and more particularly to a pumping apparatus for mixing and delivering normally separated liquid components.

Various aerosol devices have been employed for mixing and dispensing pressurized liquid components upon opening of a valve orifice.

It is the object of the present invention to provide a pumping apparatus for dispensing mixed components.

It is a further object to provide an apparatus which maintains at least two liquid components entirely separate prior to mixing.

It is a further object to provide an apparatus for storing and mixing two liquid components which would be unstable if stored as a single mixture.

It is a still further object to provide an apparatus for complete mixing and smooth delivery of mixed components.

Briefly, the apparatus for dispensing mixed components includes a mixing chamber with first and second means for directing separate liquid components into the mixing chamber. Valve means normally prevents the liquid components from entering the mixing chamber from the first and second component directing means. Pump means opens the valve means to draw the liquid components into the mixing chamber for mixing and dispensing of the mixed components from the mixing chamber.

Figure 2:
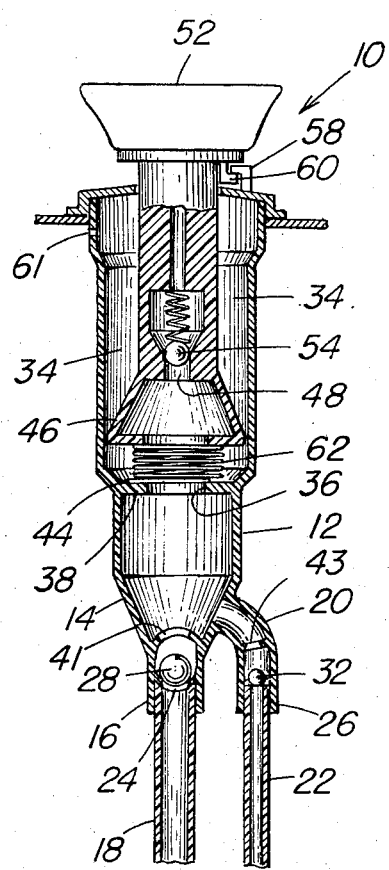

Other objects, aspects and advantages of the present invention will be more apparent when the detailed description is considered in conjunction with the drawing, as follows:

FIG. 1 is a sectional view of an embodiment of an apparatus according to the present invention for dispensing mixed components shown in the open position, and FIG. 2 is a sectional view of the apparatus of FIG. 1 shown in the closed position.

Referring to FIGS. 1 and 2, the apparatus 10 for dispensing mixed components includes a mixing chamber 12. The mixing chamber 12 is generally cylindrical in shape with a bottom conically shaped portion 14 extending downwardly therefrom. First means for directing a first liquid component into the mixing chamber 12 is shown as a conduit 16 extending downwardly from the apex of the conical portion 14 and having a dip tube 18 mounted thereon. Second means for directing a second liquid component into the mixing chamber 12 is shown as a conduit 20 entering the sidewall 21 of the conical portion 14 and having a dip tube 22, having a diameter generally smaller than the diameter of dip tube 18, mounted thereon.

The upper ends 24 and 26 of the dip tubes 18 and 22, respectively, have openings for the reception or seating of ball check valves 28 and 32, respectively, thereon. The ball check valves 28 and 32 normally prevent the liquid components from entering the mixing chamber 12 through dip tubes 18 and 22 connected to reservoirs (not shown), see FIG. 2.

Positioned above the ball check valves 28 and 32 are positive seal stops 40 and 42 including seating orifices 41 and 43, respectively. The positive seal stops 40 and 42 restrain the upward movement of the ball check valves 28 and 32, respectively, providing a positive sealing seat for the ball check valves 28 and 32 in the orifices 41 and 43 as the ball valves move upward.

Extending upwardly from the mixing chamber 12 is a pump chamber 34 normally in communication with the mixing chamber 12 through orifice 36 arranged in transverse wall 38 separating the two chambers 12 and 34. The transverse wall 38 has a spring biased flap valve 44 connected thereto for opening and closing of the orifice 36.

A piston 46 is positioned in the pump chamber 34 for reciprocating upward and downward movement in response to external pressure, e.g., from a finger. The piston 46 includes a central aperture 48 in communication with the hollow stem or delivery tube 50 of the spout 52. A spring biased ball check valve 54 is positioned in an enlargement 56 located within the stem 50 for opening and closing the aperture 48.

The apparatus 10 advantageously includes a first latch member 58 mounted on the top of the pump chamber 34 for engagement with second latch member 60 mounted on the stem 50 below the spout 52. The latch members 58 and 60 may be engaged when the apparatus 10 is not in use, by rotating the stem 10, e.g., one-fourth turn, until the first latch member 58 engages the second latch member 60 to prevent dispensing. Further, a vent hole 61 is provided in the pump chamber 34.

In operating the apparatus 10, it is initially primed by disengaging the latch members 58 and 60, thereby allowing the biasing spring 62 of the flap valve 44 to move the piston 46 upward in the pump chamber 34. The flap valve 44 moves upwardly as the spring 62 is de-compressed providing communication between the mixing chamber 12 and pump chamber 34. The resulting vacuum created in the pump chamber 34 communicates with the mixing chamber through the aperture 36, unseating the ball check valves 28 and 32 and withdrawing the separated liquid components upward through the dip tubes 18 and 22 for mixing in the mixing chamber 12.

The liquid component passing through the conduit 20 is introduced at an angle to the direction of the liquid flow from the main dip tube 18 to aid in turbulent mixing of the liquids. The mixed components are drawn upwardly from the mixing chamber 12 into the pump chamber 34 by the upward movement of the piston 46 where they remain, prior to dispensing, being prevented from moving into the hollow stem by ball check valve 54.

Downward movement of the piston 46, e.g., by downwardly directed finger pressure on the spout 52, results in closing the flap valve 44, thereby holding or trapping a measured portion of the mixed product within the pump chamber 34, and forcing the mixed product through the hollow stem 50 to the spout 52 by the action of the piston 46 as the ball check valve 54 is moved upwardly.

It should be understood that the present invention may be advantageously utilized to prevent premature mixing of a plurality of liquid components prior to dispensing and to provide good product mixing and smooth delivery during dispensing.

What is claimed is:

1. Apparatus for mixing separated liquid components and dispensing the resulting product comprising:
   a mixing chamber;

a first dip tube arranged to enter said mixing chamber at the bottom thereof to transmit a first liquid component thereto;

a second dip tube arranged to enter said mixing chamber at its sidewall to transmit a second liquid component thereto;

said second dip tube having a diameter smaller than the diameter of said first dip tube;

valve means arranged in said dip tubes at their entrance to said mixing chamber to normally obturate said dip tubes and prevent the liquid components from entering into said mixing chamber;

a pump connected to said mixing chamber for simultaneously opening said valve means to draw the first and second liquid components into said mixing chamber for simultaneously mixing the liquid components, said pump including a pump chamber, a piston positioned for reciprocal upward and downward movement in said pump chamber, means for biasing said piston toward said upward piston, and a delivery tube extending upwardly from said pump chamber to a dispensing spout, the downward movement of said piston forcing the mixed components through said delivery tube and out said spout; and positive means positioned in said mixed chamber for retaining upward movement of said valve means when said piston is moved upwardly.

2. Apparatus as claimed in claim 1 including:

valve means for preventing communication between said chambers during movement of said piston into said downward position.

* * * * *

UNITED STATES PATENT OFFICE
CERTIFICATE OF CORRECTION

Patent No. 3,786,963      Dated January 22, 1974

Inventor(s) GOTTFRIED METZLER III

It is certified that error appears in the above-identified patent and that said Letters Patent are hereby corrected as shown below:

Column 4, Claim 1, line 9, "mixed" should read -- mixing --.

Signed and sealed this 30th day of July 1974.

(SEAL)
Attest:

McCOY M. GIBSON, JR.
Attesting Officer

C. MARSHALL DANN
Commissioner of Patents